United States Patent
Youn et al.

(10) Patent No.: US 12,200,595 B2
(45) Date of Patent: Jan. 14, 2025

(54) PATH-SWITCHING BETWEEN PC5 LINK AND UU LINK

(71) Applicant: LG Electronics Inc., Seoul (KR)

(72) Inventors: Myungjune Youn, Seoul (KR); Hyunsook Kim, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 17/771,644

(22) PCT Filed: Oct. 19, 2020

(86) PCT No.: PCT/KR2020/014213
§ 371 (c)(1),
(2) Date: Apr. 25, 2022

(87) PCT Pub. No.: WO2021/091115
PCT Pub. Date: May 14, 2021

(65) Prior Publication Data
US 2022/0417825 A1      Dec. 29, 2022

(30) Foreign Application Priority Data

Nov. 5, 2019   (KR) .................. 10-2019-0139861

(51) Int. Cl.
*H04W 40/12* (2009.01)
*H04W 24/10* (2009.01)
*H04W 76/14* (2018.01)

(52) U.S. Cl.
CPC .......... *H04W 40/12* (2013.01); *H04W 24/10* (2013.01); *H04W 76/14* (2018.02)

(58) Field of Classification Search
CPC ..... H04W 40/12; H04W 24/10; H04W 76/14; H04W 76/11; H04W 76/12; H04W 76/22;
(Continued)

(56) References Cited

U.S. PATENT DOCUMENTS

2019/0037636 A1* 1/2019 Kim ................... H04W 76/28
2021/0029590 A1* 1/2021 Ying ................... H04W 8/08

FOREIGN PATENT DOCUMENTS

WO  WO2017142362   8/2017
WO  WO2019196847   10/2019

OTHER PUBLICATIONS

Garcia-Roger et al., "5G Functional Architecture and Signaling Enhancements to Support Path Management for eV2X", Feb. 27, 2019, IEEE Access, vol. 7, pp. 20484-20498 (Year: 2019).*
(Continued)

*Primary Examiner* — Farid Seyedvosoghi
(74) *Attorney, Agent, or Firm* — Fish & Richardson P.C.

(57) ABSTRACT

One embodiment of the present specification can provide a method for performing a protocol data unit (PDU) session-related procedure. The method can comprise the steps of: transmitting, to a session management function (SMF) device, a PDU session-related message including a first indication related to communication through a PC5 link; and receiving a response message from the SMF device. The response message can include: a first quality of service (QoS) rule to be used on a Uu link; a second QoS rule to be used on a PC5 link; and a path selection rule about whether data should be transmitted through the Uu link or the PC5 link.

14 Claims, 20 Drawing Sheets

(58) Field of Classification Search
CPC ....... H04W 8/06; H04W 92/10; H04W 92/18; H04W 28/24; H04W 80/10
See application file for complete search history.

(56) References Cited

OTHER PUBLICATIONS

Brahmi et al., "Deliverable D4.1: Initial design of 5G V2X system level architecture and security framework," 5GCAR/D4.1, 5GPP, Apr. 2018, 151 pages.

CATT, "Procedure on QoS Support over PC5 interface," S2-188159 (revision of S2-18xxxx), Presented at SA WG2 Meeting #128bis, Aug. 20-24, 2018, Sophia Antipolis, France, 4 pages.

Garcia-Roger et al., "5G Functional Architecture and Signaling Enhancements to Support Path Management for eV2X," IEEE Access, Feb. 2019, 7: 20484-20498.

* cited by examiner

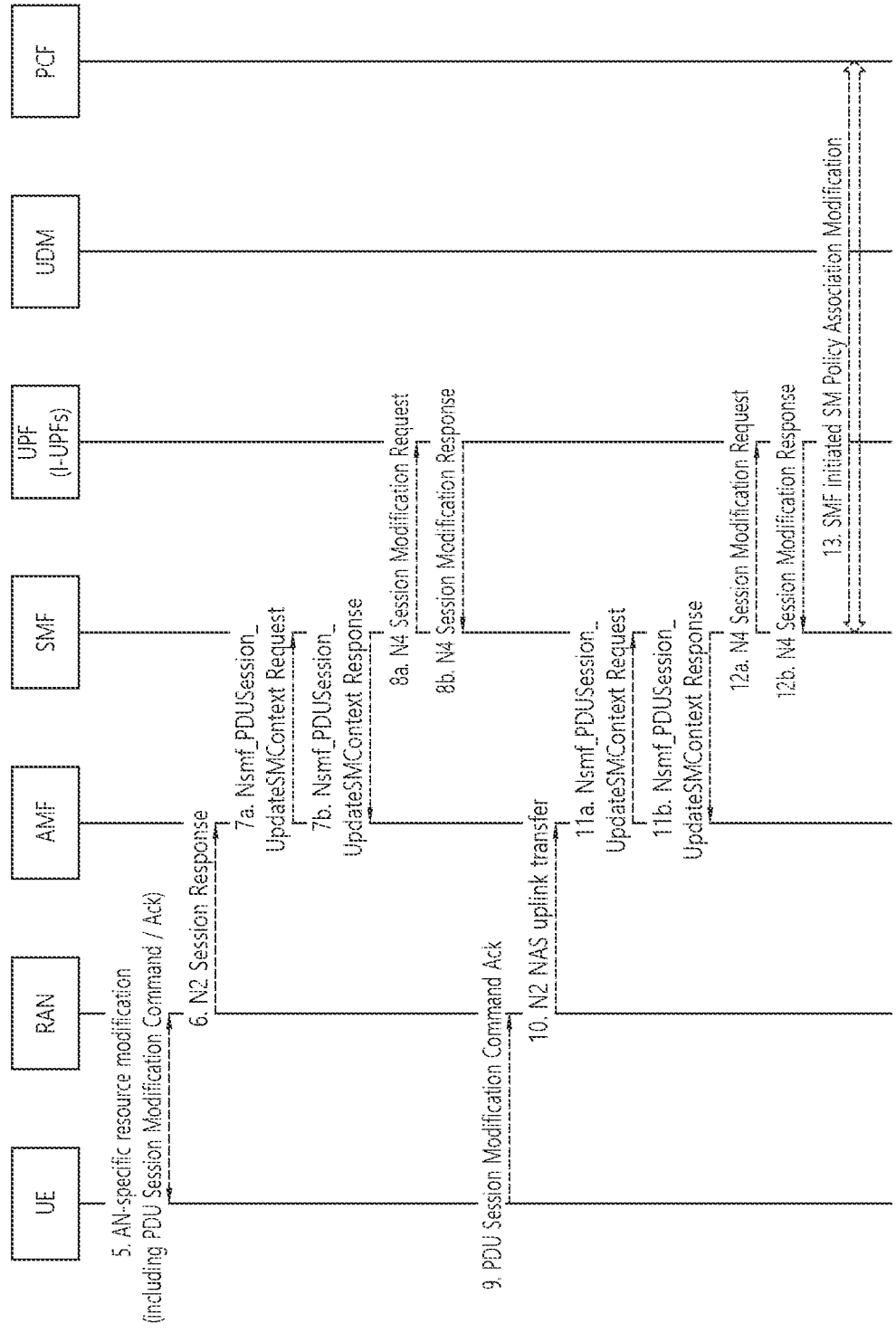

PATH-SWITCHING BETWEEN PC5 LINK AND UU LINK

CROSS-REFERENCE TO RELATED APPLICATIONS

This application is a National Stage application under 35 U.S.C. § 371 of International Application No. PCT/KR2020/014213, filed on Oct. 19, 2020, which claims the benefit of Korean Patent Application No. 10-2019-0139861, filed on Nov. 5, 2019. The disclosures of the prior applications are incorporated by reference in their entirety.

TECHNICAL FIELD

The present specification relates to mobile communications.

BACKGROUND

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G Core network (5GC) may include various components, part of which are shown in FIG. 1, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, a UE can simultaneously access two data networks using multiple Protocol Data Unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
  NAS procedures related to AMF include the following.
  Registration management and access management procedures. AMF supports the following functions.
    Secure NAS signal connection between UE and AMF (integrity protection, encryption)
2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

Meanwhile, due to an increase in user requirements for a Social Network Service (SNS), communication between UEs at a physically close distance, i.e., Device to Device (D2D) communication is required.

A link between UEs used for D2D communication is also called a sidelink or a PC5 link. In contrast to this, an existing link with a base station is also called a Uu link.

When UEs attempt to switch from the Uu link to the PC5 link, i.e., when communication is performed through the Uu link and direct communication is attempted through the PC5 link, a technical method for this is not presented.

SUMMARY

Accordingly, an object of the present specification is to propose a method for solving the above-described problems.

In order to solve the above-described problems, a disclosure of the present specification may provide a method of performing a Protocol Data Unit (PDU) session related procedure. The method may comprise transmitting a PDU session related message including a first indication related to a communication through a PC5 link to a Session Management Function (SMF) device; and receiving a response message from the SMF device. The response message may include: a first Quality of Service (QoS) rule to be used on a Uu link, a second QoS rule to be used on the PC5 link, and a path selection rule for whether data should be transmitted over the Uu link or the PC5 link.

In order to solve the above-described problems, a disclosure of the present specification may provide a chipset mounted on a User Equipment (UE). The chipset may comprise at least one processor; and at least one memory for storing instructions and operably electrically connectable to the at least one processor. The instructions, based on being executed by the at least one processor, may perform operations comprising: transmitting a PDU session related message including a first indication related to a communication through a PC5 link to a Session Management Function (SMF) device; and receiving a response message from the SMF device. The response message may include: a first Quality of Service (QoS) rule to be used on a Uu link, a second QoS rule to be used on the PC5 link, and a path selection rule for whether data should be transmitted over the Uu link or the PC5 link.

In order to solve the above-described problems, a disclosure of the present specification may provide a device for a User Equipment (UE). The device may comprise a transceiver; at least one processor; and at least one memory for storing instructions and operably electrically connectable to the at least one processor. The instructions, based on being executed by the at least one processor, may perform operations comprising: transmitting a PDU session related message including a first indication related to a communication through a PC5 link to a Session Management Function (SMF) device; and receiving a response message from the SMF device. The response message may include: a first Quality of Service (QoS) rule to be used on a Uu link, a second QoS rule to be used on the PC5 link, and a path selection rule for whether data should be transmitted over the Uu link or the PC5 link.

In order to solve the above-described problems, a disclosure of the present specification may provide a non-volatile computer-readable storage medium having recorded thereon instructions. The instructions, when executed by one or more processors mounted on a User Equipment (UE), may cause the one or more processors to perform operation comprising: transmitting a PDU session related message including a first indication related to a communication through a PC5 link to a Session Management Function (SMF) device; and receiving a response message from the SMF device. The response message may include: a first Quality of Service (QoS) rule to be used on a Uu link, a second QoS rule to be used on the PC5 link, and a path selection rule for whether data should be transmitted over the Uu link or the PC5 link.

According to the disclosure of the present specification, it is possible to solve the problems of the prior art.

BRIEF DESCRIPTION OF THE DRAWINGS

FIGS. 6A and 6B show a modification procedure for a PDU session.

DETAILED DESCRIPTION

Figure 1:
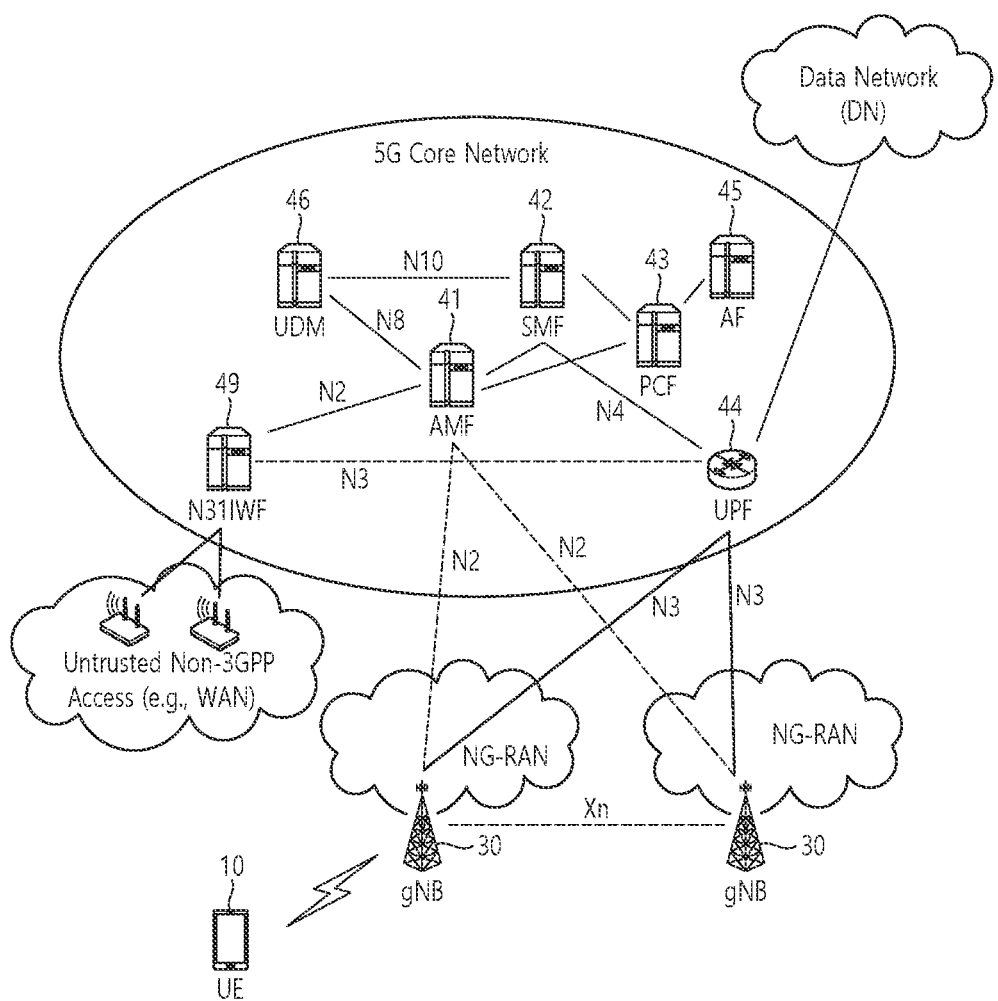
FIG. 1 is a structural diagram of a next-generation mobile communication network.
Figure 2:
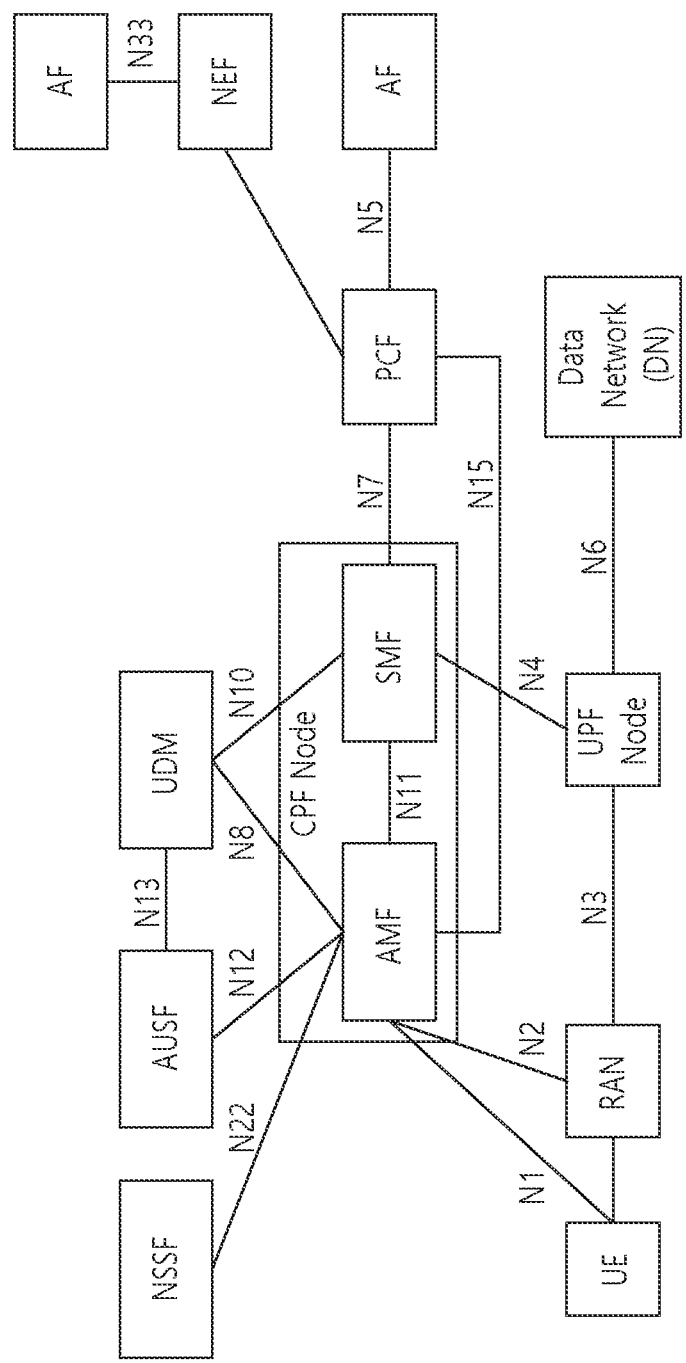
FIG. 2 is an exemplary diagram illustrating a predicted structure of a next generation mobile communication in terms of a node.
Figure 3:
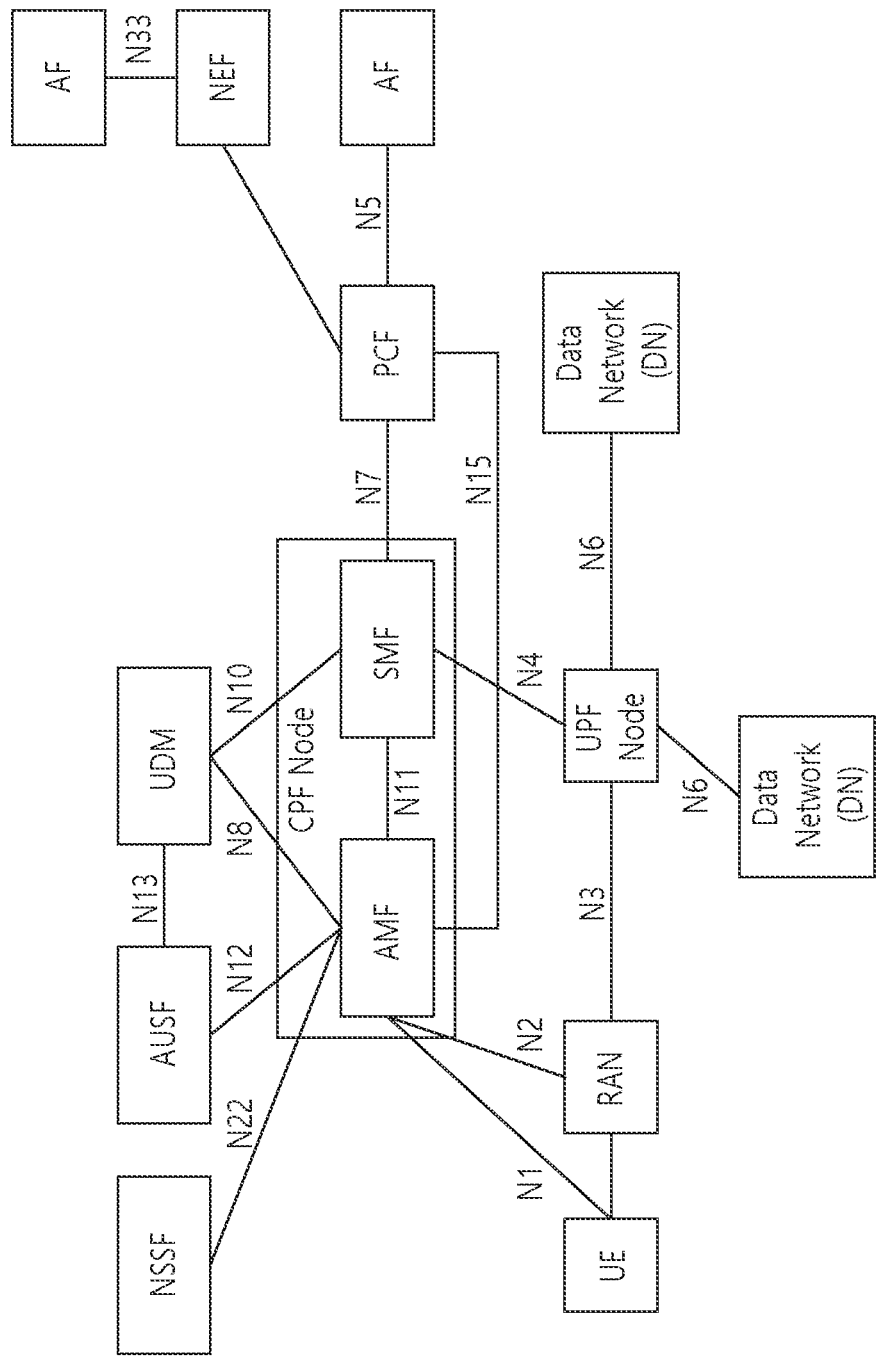
FIG. 3 is an exemplary diagram illustrating an architecture for supporting simultaneously access two data networks.
Figure 4:
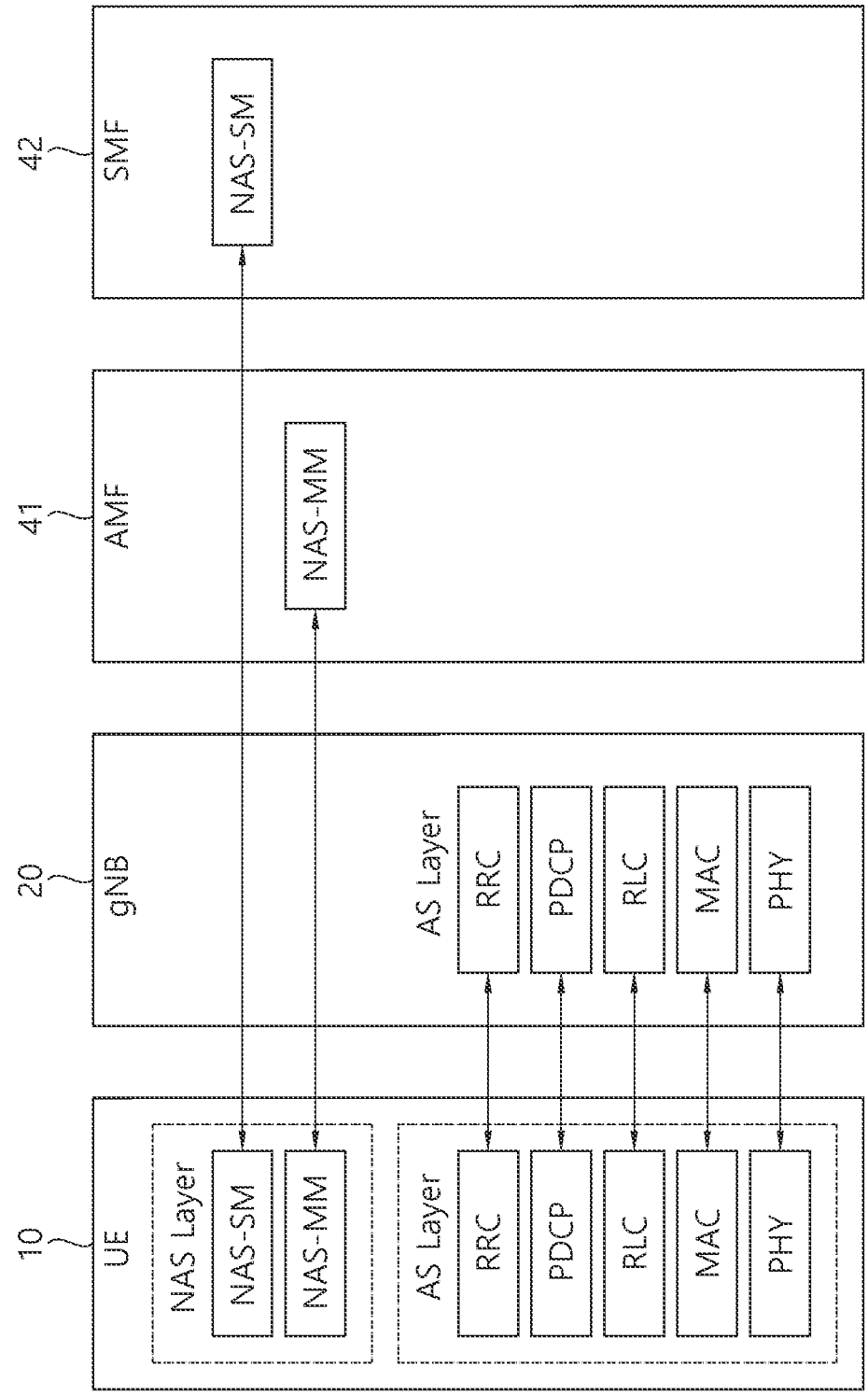
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B".

In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<PDU Session Establishment Procedure>

For the PDU Session Establishment procedure, two different types of PDU Session

Establishment procedures may exist as described below.
A PDU Session Establishment procedure initiated by the UE.
A PDU Session Establishment procedure initiated by the network. For this, the network may transmit a Device Trigger message to an application (or applications) of the UE.

Figure 5A:
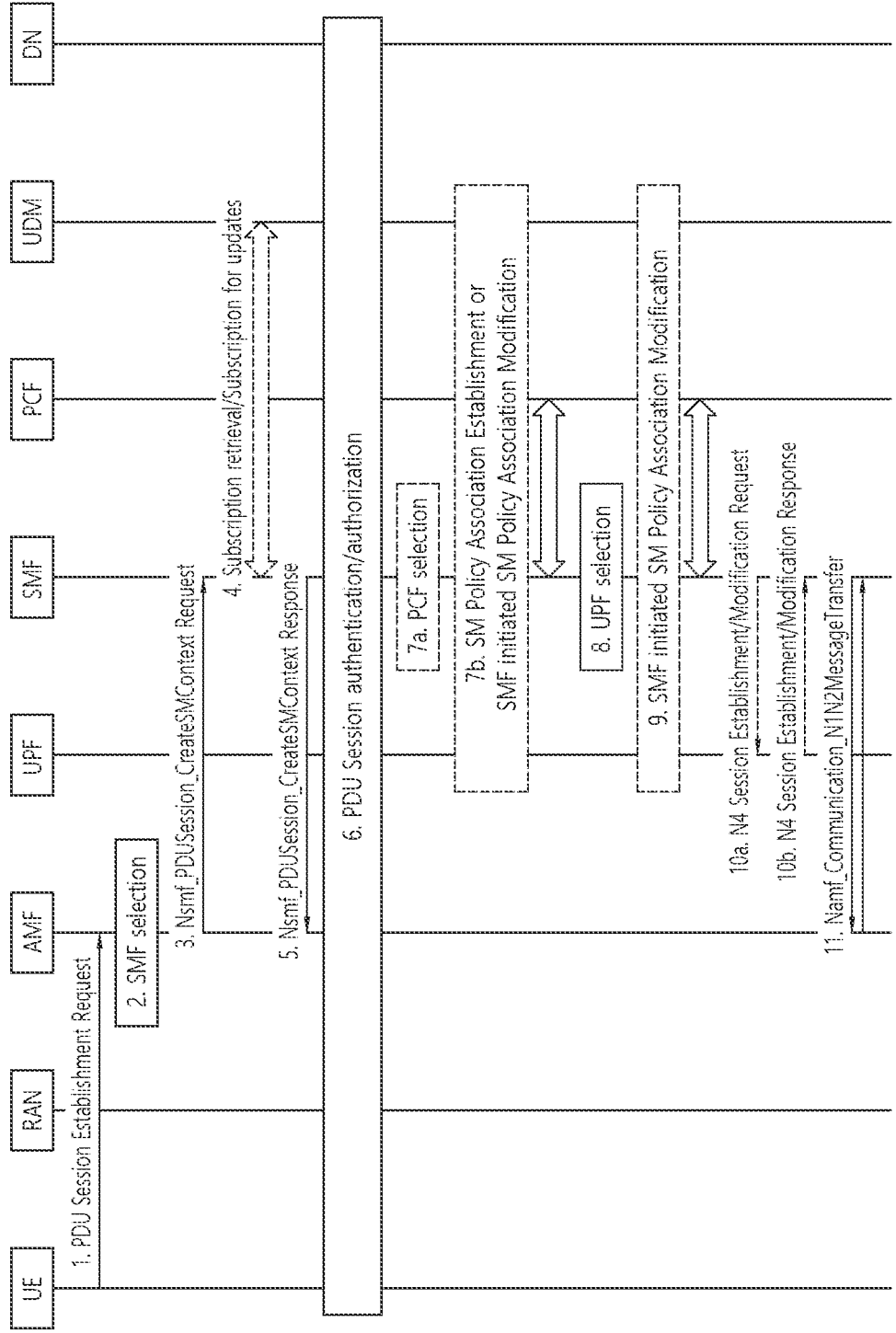
FIGS. 5A and 5B are a signal flowchart illustrating an exemplary PDU session establishment procedure.
Figure 5B:
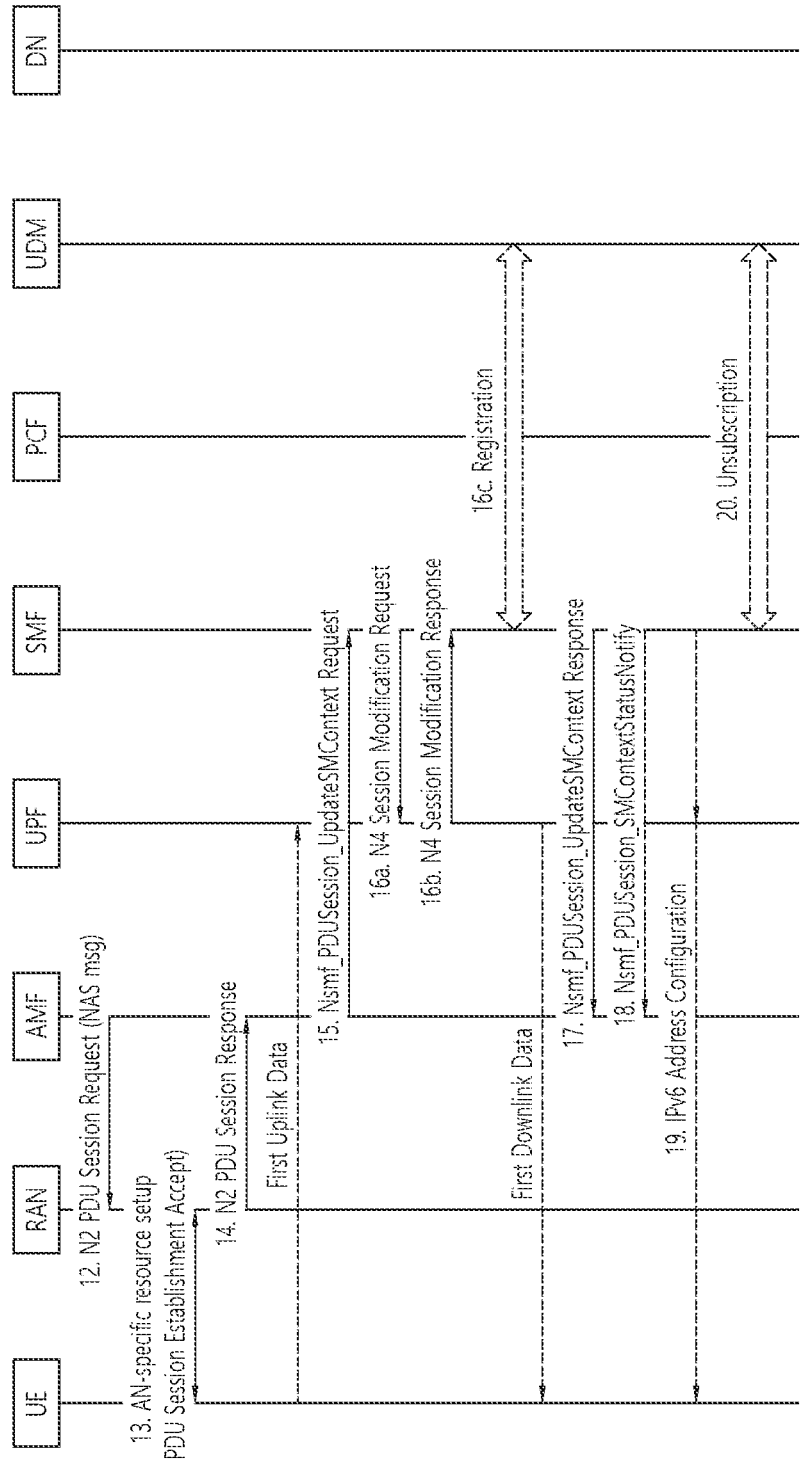

FIGS. 5A and 5B are a signal flowchart illustrating an exemplary PDU session establishment procedure.

The procedure shown in FIGS. 5A and 5B assumes that the UE has already registered on the AMF according to the registration procedure. Therefore, it is assumed that the AMF has already acquired user subscription data from UDM.

1) The UE transmits a NAS message to the AMF. The message may include Single Network Slice Selection Assistance Information (S-NSSAI), Data Network Name (DNN), PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for Home Public Land Mobile Network (HPLMN).

More specifically, the UE may extract and store the allowed NSSAI and the information on the mapped NSSAI, included in the registration accept message received from the network (i.e., AMF) in the registration procedure. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSMContext Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_PDUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSM-Context Response message to the AMF.

After this step, the AMF can deliver the related event to the SMF.

18) The SMF transmits Nsmf_PDUSession_SMContext-StatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

20) During the procedure, if the PDU Session Establishment is not successful, the SMF notifies this to the AMF.

Figure 6A:
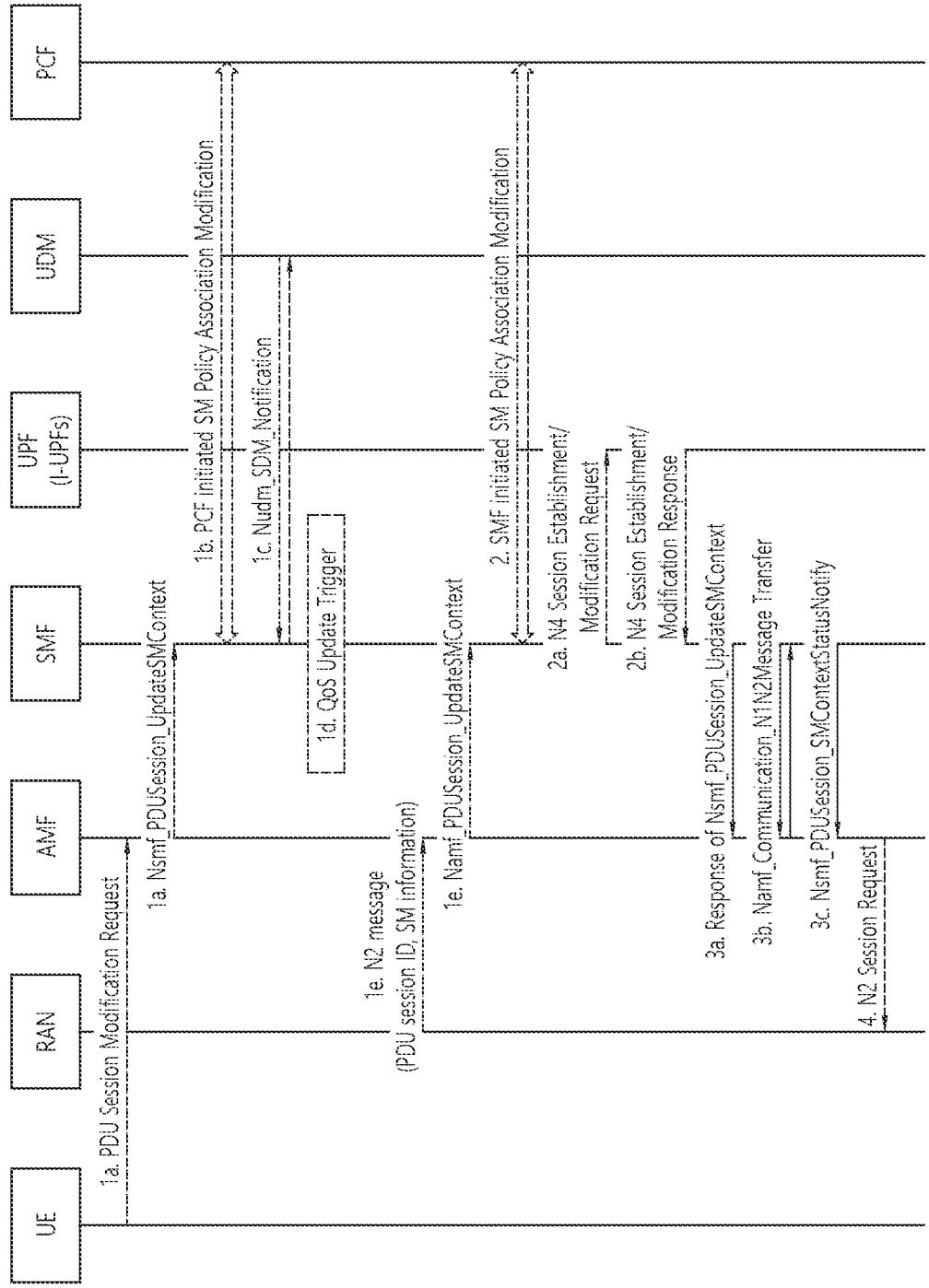

FIGS. 6A and 6B show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QoS Flow ID (QFI), user location information, and an indication indicating that the QoS flow is released.

The AMF may transmit an Nsmf_PDUSession_UpdateSM-Context message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

<Device to Device (D2D) Communication>

On the other hand, hereinafter, D2D communication will be described.

Figure 7:
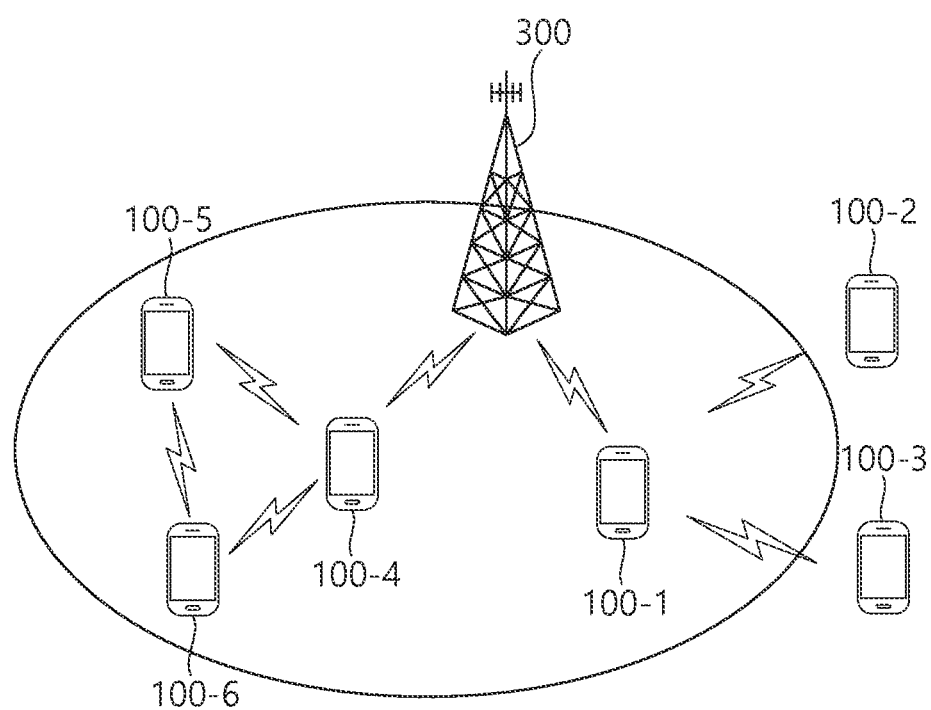
FIG. 7 shows a concept of Device to Device (D2D) communication.

FIG. 7 shows a concept of Device to Device (D2D) communication.

Due to an increase in user requirements for a Social Network Service (SNS), communication between UEs at a physically close distance, i.e., Device to Device (D2D) communication, is required. In addition, in the case of UEs used for public safety, D2D communication may be used.

In order to reflect the above requirements, as shown in FIG. 7, between UE #1 100-1, UE #2 100-2, UE #3 100-3 or between UE #4 100-4, UE #5 100-5, UE #6 100-6, a method for directly communicating without intervention of a base station (gNB) 300 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.

Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.

Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 8:
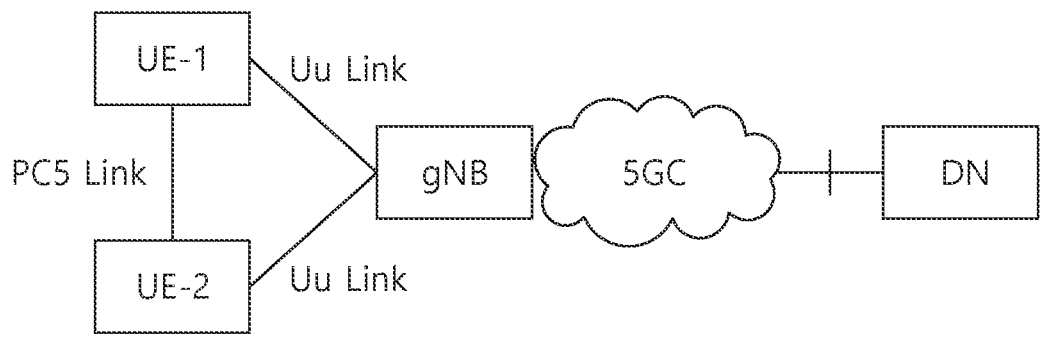
FIG. 8 shows an architecture for a ProSe service.

FIG. 8 shows an architecture for a ProSe service.

Referring to FIG. 8, UE-1 and UE-2 are respectively connected to a base station (gNB) through a Uu link. UE-1 and UE-may can also communicate directly via the PC5 link.

<Problems to be Solved by the Disclosure of the Present Specification>

Meanwhile, when UEs attempt to switch from the Uu link to the PC5 link, i.e., when they attempt to perform direct communication through a PC5 link while performing communication through a Uu link, a technical method for this is not presented.

Similarly, when UEs attempt to switch from a PC5 link to a Uu link, i.e., when they attempt to perform communication through a Uu link while performing direct communication through a PC5 link, a technical method for this is not presented.

There are the following things to consider for the above technical methods.

A method of enabling network-controlled/network-assisted path switching between Uu link and PC5 link Who is the network node to perform communication path switching and how to improve the network node for this purpose A method for preserving service continuity during communication path switching, i.e., switching from a Uu link to a PC5 link or a switching from a PC5 link to a Uu link <Disclosure of the Present Specification>

Disclosures of the present specification provide a technical method for how a network node should control, when it is necessary to switch to a Uu link while communicating through a PC5 link between UEs or to switch to a PC5 link while communicating through a Uu link. In addition, disclosures of the present specification provide a technical method for how to guarantee service continuity for the UE in the path switching process and how to guarantee Quality of Service (QoS) in the process.

In the present specification, PC5 may refer to only NR PC5, or may refer to both NR PC5 and LTE PC5.

In the present specification, NG-RAN may refer to only gNB or both gNB and ng-eNB.

Hereinafter, a PC5 unicast link will be mainly described, but the following description may be applied as well to a PC5 broadcast link or a PC5 groupcast link.

I. PC5 Link Setup Procedure

In order for an application to perform PC5 communication, it needs to receive network authorization/authentication.

To this end, the UE requests a PDU session based on a UE Route Selection Policies (URSP) rule that matches the corresponding application.

The USRP rule may be received from the PCF. In the URSP rule, a parameter indicating PC5 communication may be added unlike the existing one. In addition, a URSP rule for PC5 communication may be newly defined and used separately from a URSP rule for general Uu communication (i.e., communication using a PDU session). In the former case, a new parameter may be added to the Route selection components in the Route Selection Descriptor in the USRP to indicate the availability/preference of PC5 communication. In addition, a new value indicating the availability/preference of PC5 communication may be defined and used in the existing Access Type preference parameter.

The table below shows Route Selection Descriptor in USRP.

TABLE 3

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

(NOTE 1):
Every Route Selection Descriptor in the list shall have a different precedence value.
(NOTE 2):
At least one of the route selection components shall be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor is not considered valid unless all the provided Validation Criteria are met.
(NOTE 7):
In this Release of specification, inclusion of the Validation Criteria in Roaming scenarios is not considered.
(NOTE 8):
When the PDU Session Type is "Ethernet" or "Unstructured", this component shall be present.

Based on the USRP rule, it is possible for the UE to know whether the corresponding application allows PC5 communication.

The UE transmits the PDU session establishment request message with an indication indicating that it wants to communicate through the PC5 link.

Upon receiving this, the SMF determines whether the UE may perform direct communication through the PC5 link through subscriber information of the UE, Data Network Name (DNN), Single Network Slice Selection Assistance Information (S-NSSAI), etc. When the SMF allows direct communication through the PC5 link, the SMF transmits, to the UE, the first QoS rule to be used in the Uu link interface and the second QoS rule to be used in the PC5 link interface, respectively.

In addition, the SMF may also transmit a path selection rule for transmitting the data of the corresponding application to the UE through which link (i.e., PC5 link or Uu link).

In addition, the SMF may transmit the first QoS parameter (e.g., for the Uu link interface) and the second QoS parameter (e.g., for the PC5 link interface) to the NG-RAN, respectively.

The SMF operation may be based on an interaction with the PCF.

The path selection rule may be replaced with a URSP rule including the content for direct communication through the PC5 link described above. In this case, the path selection rule may be pre-configured in the UE or may be configured to the UE using a method of providing a URSP rule to the UE.

Based on this, the UE may decide to set up a PC5 unicast link. After the PC5 unicast link is set up or while the PC5 unicast link is setting up, the NG-RAN may perform resource scheduling for the PC5 unicast link of the UE.

Figure 9A:
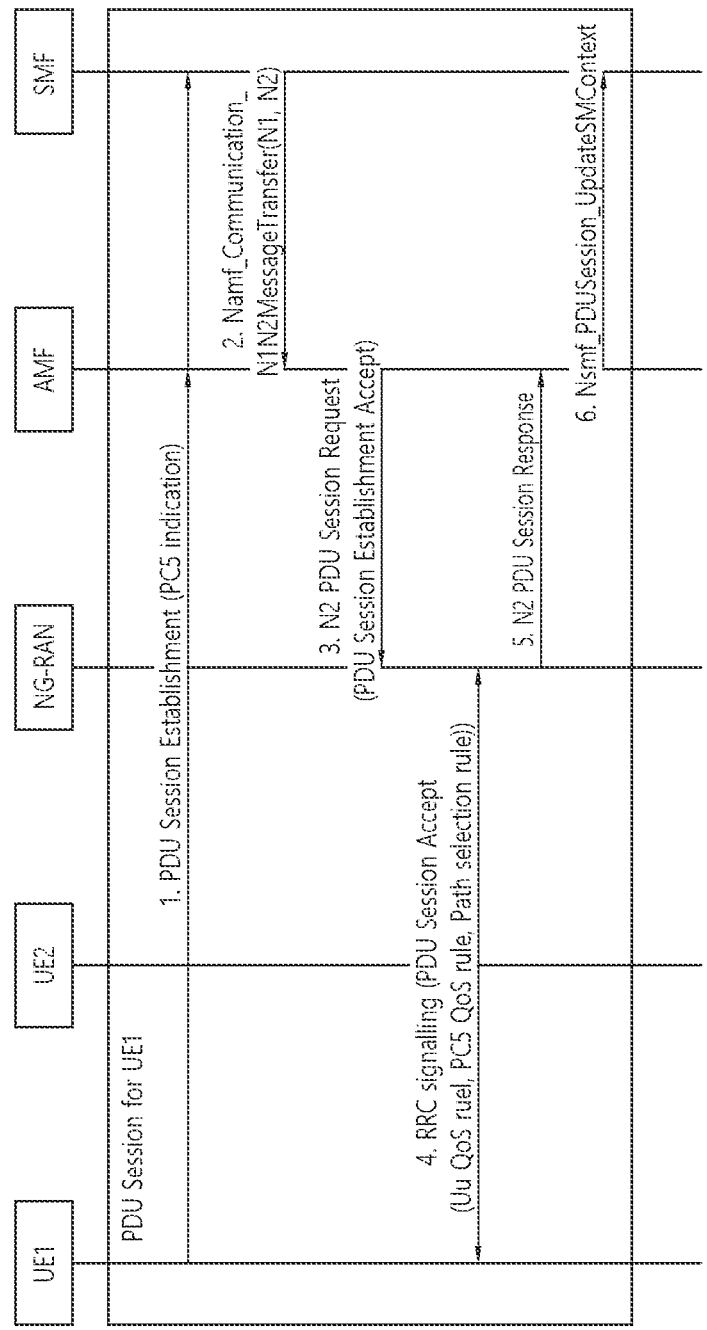
FIGS. 9A and 9B are signal flow diagrams illustrating a procedure for setting up a PC5 unicast link.
Figure 9B:
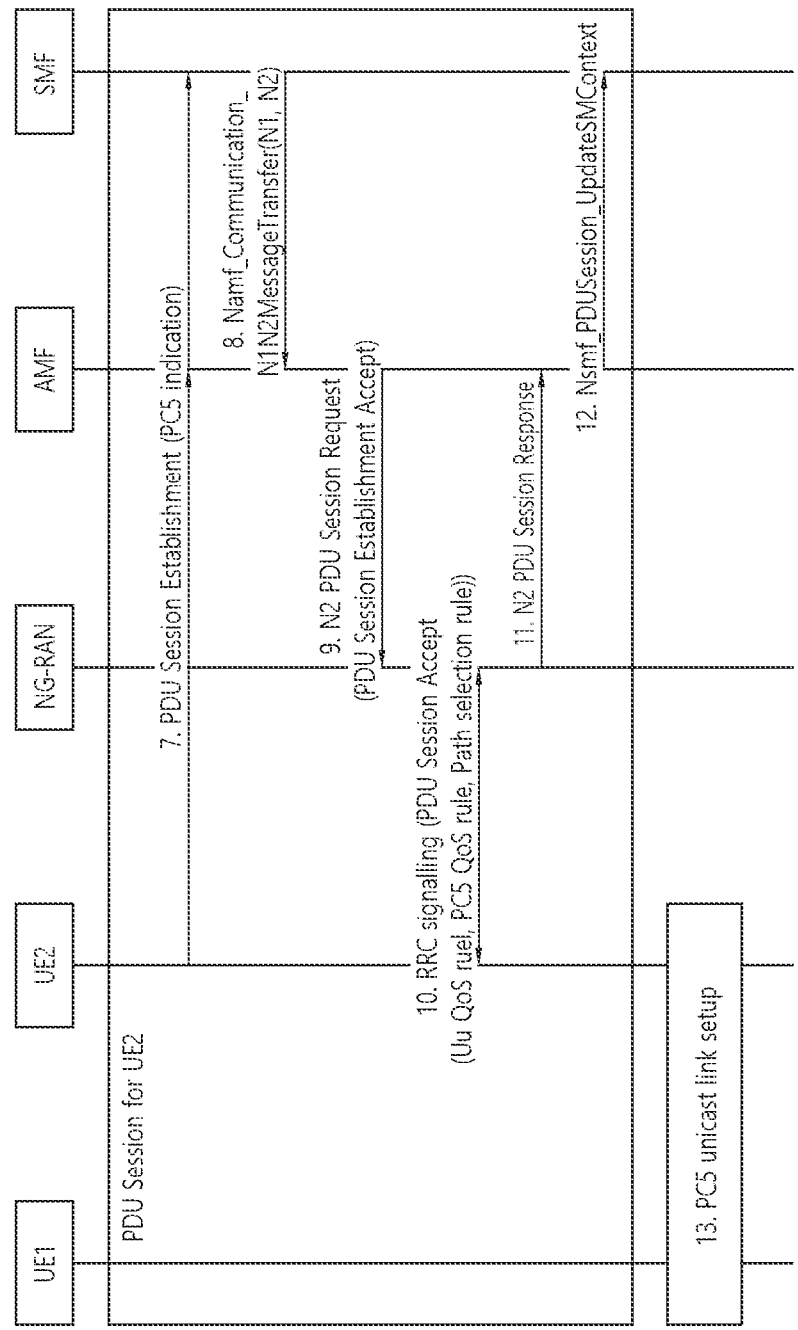

FIGS. 9A and 9B are signal flow diagrams illustrating a procedure for setting up a PC5 unicast link.

1) The UE1 performs a PDU session establishment procedure based on the URSP rule to use the PC5 unicast link. To this end, the UE1 transmits a PDU session establishment request message including a PC5 indication indicating that it wants to use a PC5 unicast link. In addition, the UE1 may include an indication indicating whether resource setup (i.e., Data Radio Bearer (DRB) generation and N3 user plane setup) for the Uu link is required in the PDU session establishment request message. The PDU session establishment request message may further include DNN, S-NSSAI, etc.

2-6) The SMF checks whether the UE1 can use the PC5 unicast link based on parameters such as PC5 indication, DNN, S-NSSAI, etc., in the PDU session establishment request message received from the UE1 and subscriber information.

When the PC5 unicast link cannot be used, the SMF may transmit a reject message including a cause value indicating that the PC5 unicast link cannot be used while rejecting the PDU generation request.

When the SMF accepts the UE1's request, the SMF transmits a PDU session establishment accept message. The PDU session establishment accept message may include a first QoS rule for the Uu link, a second QoS rule for the PC5 link, and a path selection rule.

In addition, the SMF transmits the first QoS parameter for the Uu link and the second QoS parameter for the PC5 link to the NG-RAN, respectively. Then, the NG-RAN may know that the UE1 can set up a PC5 unicast link when there is a second QoS parameter for the PC5 link.

The SMF always transmits all of a first QoS parameter for the Uu link and a second QoS parameter for the PC5 link when the UE1 transmits an indication for using the PC5 unicast link regardless of whether the UE1 needs resource setup for the Uu link. In this case, the SMF may inform the NG-RAN of whether resource setup for the Uu link is required based on the indication received from the UE1 indicating whether resource setup for the Uu link is required.

The NG-RAN may determine whether to set up a resource for the Uu link based on information received from the SMF.

In this case, the NG-RAN always maintains the UE1 in an RRC-CONNECTED state regardless of whether the Uu link resource is set up. That is, the NG-RAN always maintains an RRC-CONNECTED state even if there is no data transmitted/received on the Uu link.

When the UE1 determines that resource setup for the Uu link is not necessary (or when an indication related to PC5 is received regardless of an indication related to a Uu link from the UE1), the SMF maintains the corresponding PDU session in a deactivation state. That is, the SMF does not set up the N3 user plane. That is, the SMF does not transmit N3 Tunnel Information (UL TEID) to the NG-RAN.

Alternatively, even if the UE1 does not transmit an indication or information related to the Uu link to the SMF, the SMF may always set up the Uu link. In this case, when there is no data transmitted/received on the Uu link, the SMF may deactivate the PDU session. However, when the PDU session is deactivated as described above, since the link switching process may be slow, the SMF may leave the PDU session in an active state based on the applied QoS. For this purpose, a timer for deactivating the PDU session may not be configured in the UPF.

7-12) The UE2 also establishes a PDU session to use the PC5 unicast link through steps 1 to 6 above. These steps may be performed independently of steps 1-6. Also, NG-RAN, AMF, and SMF serving the UE2 may be different from NG-RAN, AMF, and SMF serving the UE1.

13) The UE1 and the UE2 set up a PC5 unicast link. Prior to this, both UEs may perform direct discovery through a PC5 link interface.

Although the PDU session establishment procedure has been described above as an example, the above description may also be applied to the PDU session modification procedure.

II. Path Switching from PC5 Link to Uu Link

After the UE sets up the PC5 unicast link, the UE transmits data based on the scheduling of the NG-RAN. In this case, the NG-RAN may instruct or request the UE to perform measurement on the PC5 unicast link. The measurement may be similar to the measurement on the Uu interface. The NG-RAN may transmit a configuration for a specific threshold to the UE, so that the UE may transmit a measurement report based on the threshold.

If the Uu link is not set up, upon receiving the measurement report, the NG-RAN performs a procedure for setting up a Data Radio Bearer (DRB) on the Uu link interface through RRC signaling in order to perform path switching. Then, the NG-RAN performs a procedure for setting up the N3 user plane. To this end, the NG-RAN transmits a message informing the setup of the N3 user plane to the SMF. In this case, the NG-RAN may transmit by including Downlink (DL) Tunnel ID (TEID) information used in the NG-RAN in the message informing the setup of the N3 user plane. Upon receiving the message, the SMF performs setup of the N3 user plane to the UPF and transmits Uplink (UL) TEID information to the NG-RAN. For the above DRB setup and N3 user plane setup, the NG-RAN may use the QoS parameters for the Uu link received from the SMF as described in Section I.

Simultaneously with the above or after setup of the DRB or N3 user plane is completed, the NG-RAN may instruct the UE path switching so that an application of the UE that used the PC5 unicast link transmits and receives data through the Uu link in the future. That is, DRB setup and path switching may be simultaneously performed (e.g., by transmitting an RRCReconfiguration message once in the case of gNB, or by transmitting an RRCConnectionReconfiguration message once in the case of ng-eNB). Upon receiving this, the UE (i.e., the AS layer of the UE) may transmit an indication indicating that path switching is required to an upper layer (i.e., the ProSe layer and/or the application layer).

Alternatively, if the Uu link is set up, the NG-RAN may instruct the UE path switching so that an application of the UE that used the PC5 unicast link transmits and receives data through the Uu link in the future. Upon receiving this, the UE (i.e., the AS layer of the UE) may transmit an indication indicating that path switching is required to an upper layer (i.e., the ProSe layer and/or the application layer).

Information indicating which QoS flow on the PC5 link is to be transferred to the Uu link may be transmitted together with the indication indicating that the path switching is required. For example, a list of PC5 QoS Flow Identifiers (PFIs) for QoS flows on a PC5 link may be transmitted. The UE then starts to transmit a specific QoS flow on the PC5 unicast link through the Uu link based on the path switching indication. In this case, for service continuity in the application layer, the NG-RAN may maintain the PC5 link and the Uu link together for a predetermined time. That is, even after transmitting an indication indicating that path switching is required, the NG-RAN may continue to perform resource scheduling on the PC5 link for a predetermined time for the UE. To this end, the NG-RAN may inform the UE of the time during which the PC5 link/Uu link can be used simultaneously for a predetermined time by transmitting information on the timer together with the path switching indication to the UE. When the UE completes path switching, if the PC5 link is no longer needed, the UE may perform a procedure for releasing the PC5 unicast link. The NG-RAN may not perform resource allocation for the PC5 unicast link when the timer value provided to the UE has expired.

Figure 10:
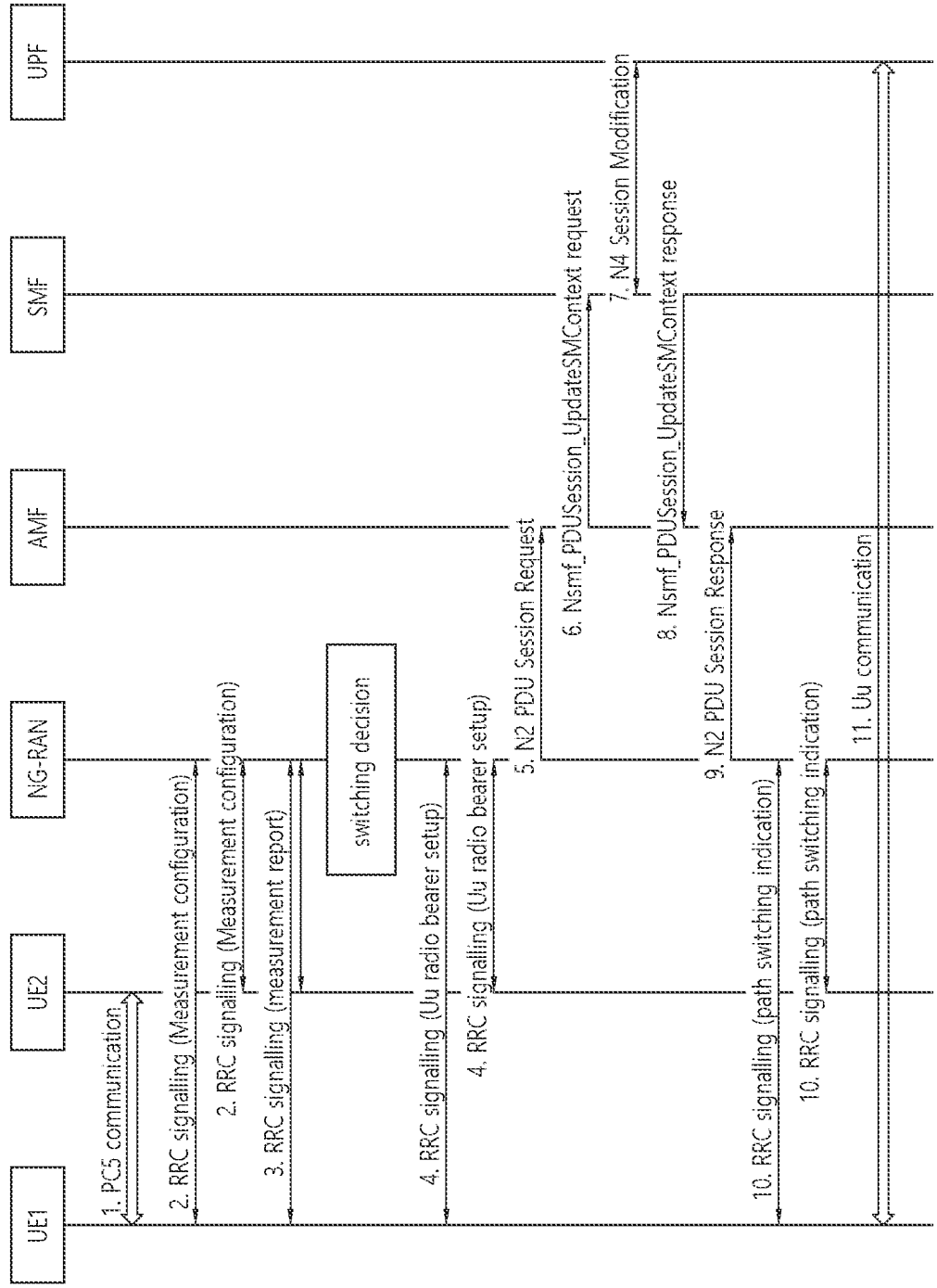
FIG. 10 is an exemplary signal flow diagram illustrating a procedure for performing path switching from a PC5 link to a Uu link.

FIG. 10 is an exemplary signal flow diagram illustrating a procedure for performing path switching from a PC5 link to a Uu link.

1) It is assumed that the UE1 and the UE2 perform steps 1 to 13 of FIG. 9 and communicate through a PC5 link.

2) The NG-RAN transmits measurement configuration for PC5 link to the UE1 and the UE2. In this case, the NG-RAN may transmit measurement configurations for the Uu link and the PC5 link to each UE at once.

3) Each UE performs measurement on the PC5 link according to the measurement configuration received from the NG-RAN, and then transmits a measurement report to the NG-RAN.

Upon receiving this, the NG-RAN may determine that path switching to the Uu link is necessary based on the measurement report for the Uu link and the PC5 link of the UE1 and the measurement report for the Uu link and the PC5 link of the UE2.

4) When the resource for the Uu link is not allocated, the NG-RAN performs resource allocation for the Uu link by transmitting RRC signaling to each UE. The reason why the resource for the Uu link is not allocated may be that the UE1 and the UE2 transmit and receive data only on the PC5 link, so that the inactivity timer for the Uu link interface expires, and thus the PDU session is deactivated. Alternatively, the SMF may have performed PDU session deactivation.

5) The NG-RAN transmits a message related to the PDU session to the AMF to activate the PDU session at the same time as resource setup for the Uu link. In this case, the NG-RAN may transmit DL TEID information allocated to itself together.

6) The AMF delivers the message transmitted by the NG-RAN to the SMF.

7) The SMF transmits DL TEID information to the UPF while performing N4 session modification procedure with the UPF, and requests and obtains UL TEID information from the UPF.

8) The SMF transmits the N2 PDU session response message including the UL TEID to the AMF.

9) The AMF delivers the message received from the SMF to the NG-RAN.

Steps 5 to 9 above are respectively performed for the first PDU session of the UE1 and the first PDU session of the UE2. The SMF managing the first PDU session may be different from the SMF managing the second PDU session.

10) After the PDU session of the UE1 and the PDU session of the UE2 are both activated, the NG-RAN transmits RRC signaling to the UE1 and the UE2 to inform the use of the Uu link. In this case, the NG-RAN may selectively instruct to use the Uu link for each QoS flow.

11) The UE1 and UE2 communicate through the Uu link without using the PC5 link any longer based on information in the RRC signal received from the NG-RAN. If only some QoS flows are moved to the Uu link, the remaining QoS flows may remain in the PC5 link as they are.

III. Path Switching from Uu Link to PC5 Link

If the first UE receives permission to use the PC5 unicast link from the network while performing communication through the Uu link, the first UE may have performed a proximity request in order to be notified when the peer second UE communicating through the Uu link comes within a specific range (i.e., within a distance range where communication via the PC5 link is possible). Alternatively, the first UE or the second UE may perform the proximity request to the application server.

Thereafter, when receiving a notification that the peer UE communicating through the Uu link has come into proximity, the UE may perform path switching from the Uu link to the PC5 link. Such path switching may be determined by an application layer of the UE and instruct to a lower layer (which may be a ProSe layer), or may be determined by the ProSe layer.

If the UE decides to perform path switching, it may perform a PC5 unicast link setup procedure. Prior to this, both UEs may perform a direct discovery procedure through a PC5 link interface.

As another method, when receiving a notification that the peer UE has come into proximity, the UE may transmit to the NG-RAN through RRC signaling to inform the NG-RAN that PC5 unicast link setup is possible. Upon receiving this, the NG-RAN may determine whether switching to the PC5 link interface is required/permitted. For example, when the corresponding Uu link does not properly support the QoS flow through monitoring of the QoS flow on the Uu link, and when it is recognized that the UE can use the PC5 link in the process related to the PDU session, the NG-RAN may instruct the UE path switching. At this time, the NG-RAN may transmit information indicating which QoS flow on the Uu link to the PC5 link to move to the UE. For example, a QoS Flow Identifier (QFI) list for QoS flows on the Uu link may be transmitted to the UE.

The UE then moves a specific QoS flow on the Uu link to the PC5 link based on the path switching indication.

In this case, for service continuity in the application layer, the NG-RAN may maintain the PC5 link and the Uu link together for a predetermined time.

That is, even after transmitting an indication indicating that path switching is required, resource scheduling may be continuously performed for the UE on the Uu link for a predetermined time.

To this end, the NG-RAN may inform the UE of a time during which the PC5 link and the Uu link can be used simultaneously for a given period by transmitting timer information together with the path switching indication to the UE.

The NG-RAN may release resource allocation (e.g., DRB) for the Uu link when the timer value provided to the UE expires. However, the NG-RAN may keep the UE in RRC-CONNECTED.

Figure 11:
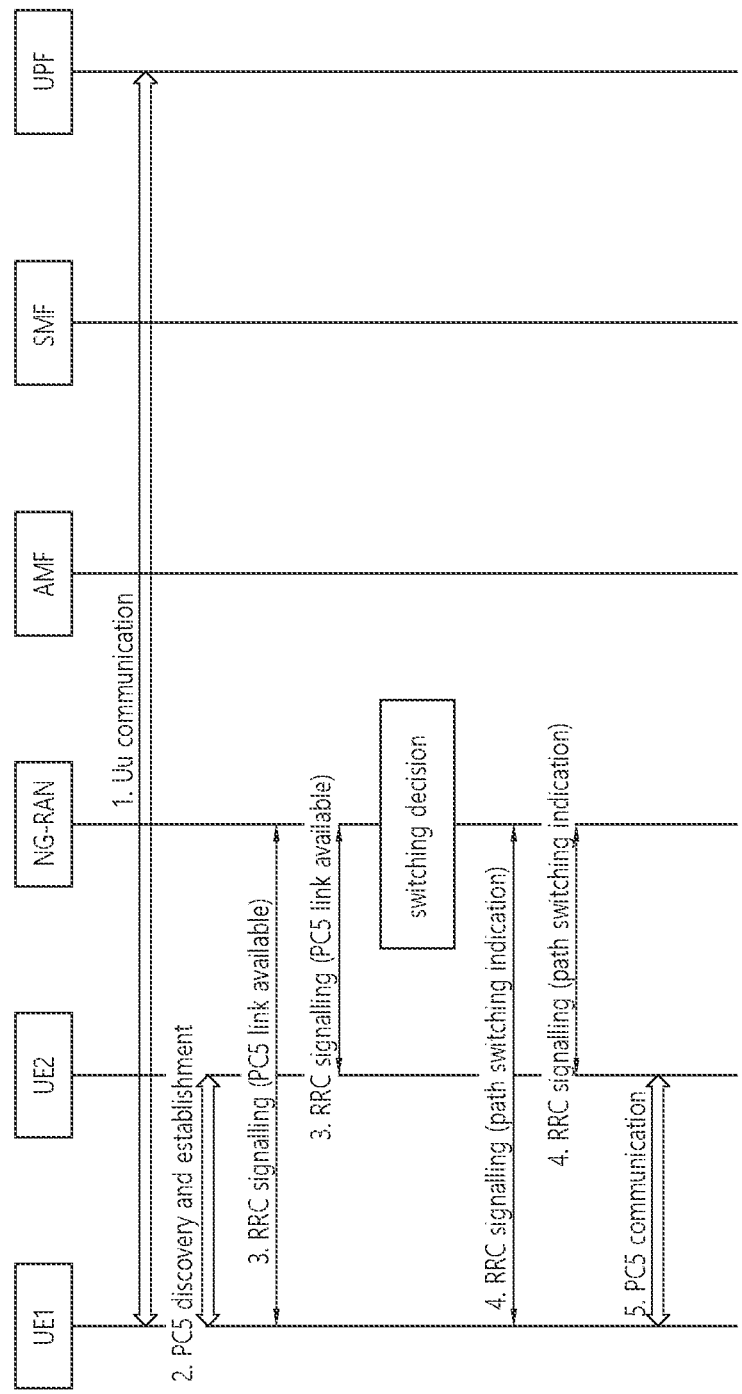
FIG. 11 is an exemplary signal flow diagram illustrating a procedure for performing path switching from a Uu link to a PC5 link.

FIG. 11 is an exemplary signal flow diagram illustrating a procedure for performing path switching from a Uu link to a PC5 link.

1) It is assumed that the UE1 and the UE2 perform steps 1 to 13 of FIG. 9 and communicate through a PC5 link.

2) Upon recognizing that the UE1 and the UE2 are close to each other based on the proximity request, the UE1 and the UE2 perform a discovery process on the PC5 link and perform a procedure for setting up the PC5 link.

3) Each UE informs that it can use the PC5 link to the NG-RAN. Thereafter, the NG-RAN may request measurement on the PC5 link to each UE by transmitting the measurement configuration through the RRC signal as in the process of FIG. 10.

Based on this, the NG-RAN may determine whether to perform path switching.

4) The NG-RAN transmits RRC signaling to the UE1 and the UE2 to inform that the PC5 link is to be used.

5) The UE1 and the UE2 decide not to use the Uu link anymore and communicate via the PC5 link based on the information received from the NG-RAN. If only some QoS flows on the Uu link are moved to the PC5 link, the remaining QoS flows are left on the Uu link as they are.

Hereinafter, an apparatus to which the above disclosure of the present specification can be applied will be described.

Figure 12:
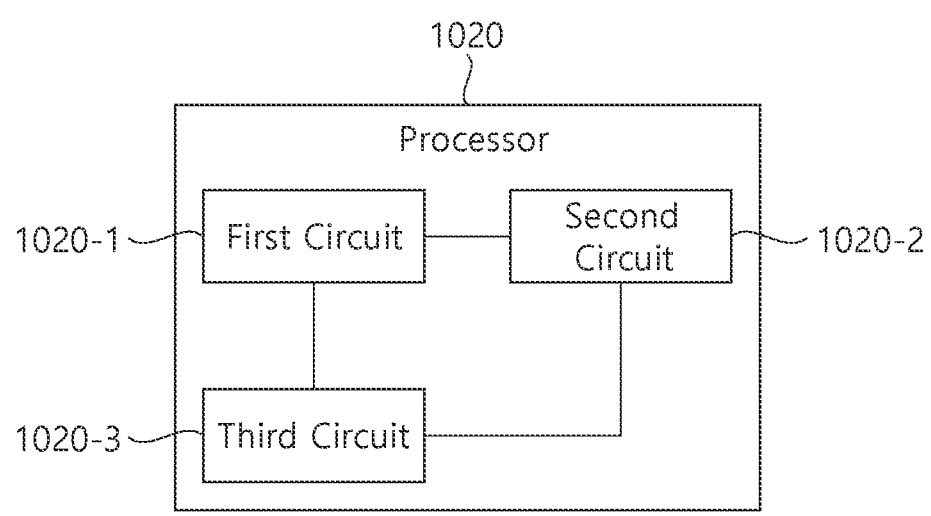
FIG. 12 shows a block diagram of a processor in which the disclosure of the present specification is implemented.

FIG. 12 shows a block diagram of a processor in which the disclosure of the present specification is implemented.

As can be seen with reference to FIG. 12, a processor 1020 in which the disclosure of the present specification is implemented may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be mounted on the UE.

The first circuit 1020-1 of the processor mounted on the UE may transmit a Protocol Data Unit (PDU) session related message including a first indication related to a communication through a PC5 link to a Session Management Function (SMF) device.

The second circuit 1020-2 of the processor mounted on the UE may receive a response message from the SMF device.

The response message may include: a first Quality of Service (QoS) rule to be used on a Uu link, a second QoS rule to be used on the PC5 link, and a path selection rule for whether data should be transmitted over the Uu link or the PC5 link.

The PDU session related message may be a PDU session establishment request message or a PDU session modification request message. The response message may be a PDU session establishment accept message or a PDU session modification command.

The third circuit 1020-3 of the processor mounted on the UE may setting up a PC5 link with a peer UE.

The fourth circuit (not shown) of the processor mounted on the UE may receive a measurement configuration for the PC5 link from a base station.

The fifth circuit (not shown) of the processor mounted on the UE may perform measurement on the PC5 link based on the measurement configuration and transmitting a measurement report to the base station.

The sixth circuit (not shown) of the processor mounted on the UE may receive an RRC signal for path switching to the Uu link from the base station.

The seventh circuit (not shown) of the processor mounted on the UE may perform a procedure of setting up a Data Radio Bearer (DRB) through the Uu link based on the RRC signal.

In order to set up the PC5 link with the peer UE, the third circuit 1020-3 of the processor mounted on the UE may transmit, to the base station, a first Radio Resource Control (RRC) message including an indication informing that PC5 link setup is possible, based on proximity of the peer UE. In addition, the third circuit 1020-3 of the processor mounted on the UE may receive, from the base station, a second RRC message including an indication informing path switching. In addition, the third circuit 1020-3 of the processor mounted on the UE may set up the PC5 link with the peer UE based on the indication informing the path switching.

The second message may further include information about a timer.

The PC5 link and the Uu link may be both available until the timer based on the information expires.

Figure 13:
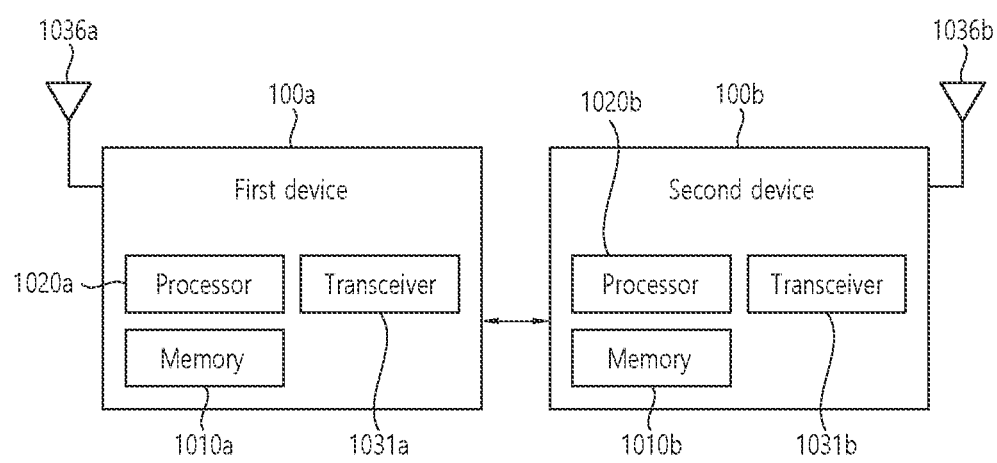
FIG. 13 illustrates a wireless communication system according to an embodiment.

FIG. 13 illustrates a wireless communication system according to an embodiment.

Referring to FIG. 13, the wireless communication system may include a first device 100a and a second device 100b.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 14:
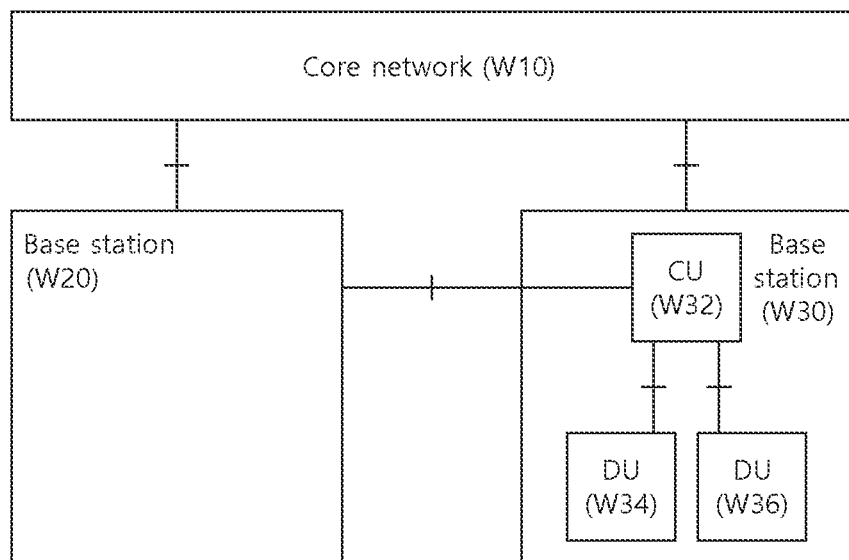
FIG. 14 illustrates a block diagram of a network node according to an embodiment.

FIG. 14 illustrates a block diagram of a network node according to an embodiment.

In particular, FIG. 14 is a diagram illustrating in detail a case in which a base station is divided into a Central Unit (CU) and a Distributed Unit (DU).

Referring to FIG. 14, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 15:
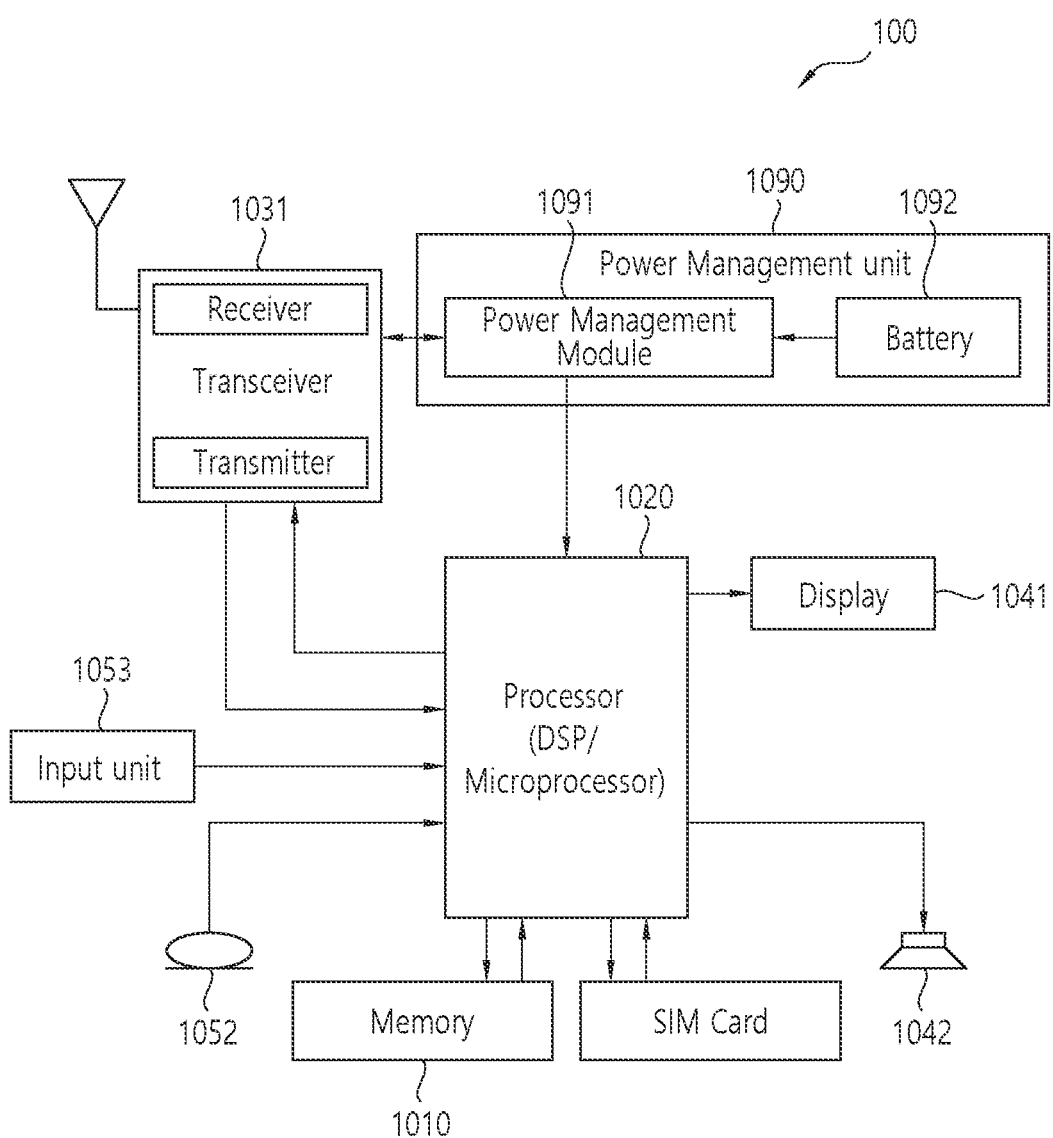
FIG. 15 is a block diagram illustrating a configuration of a UE according to an embodiment.

FIG. 15 is a block diagram illustrating a configuration of a UE according to an embodiment.

In particular, the UE 100 shown in FIG. 15 is a diagram illustrating the first device of FIG. 13 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 16:
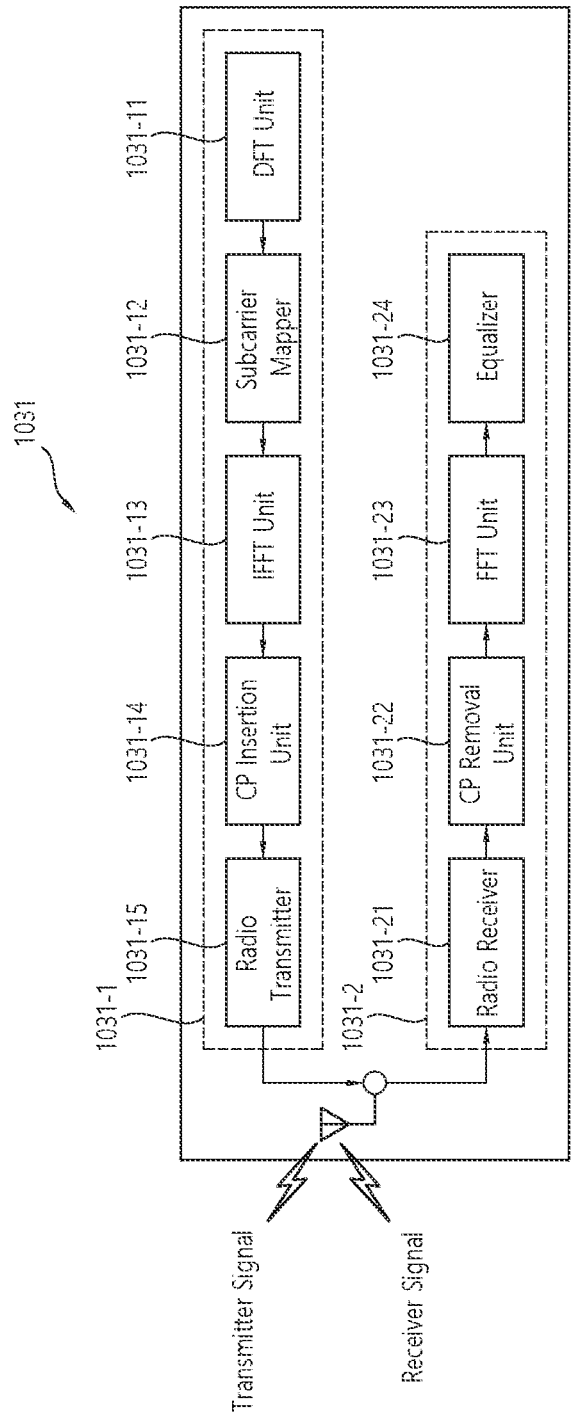
FIG. 16 is a detailed block diagram illustrating the transceiver of the first device shown in FIG. 13 or the transceiver of the device shown in FIG. 15 in detail.

FIG. 16 is a detailed block diagram illustrating the transceiver of the first device shown in FIG. 13 or the transceiver of the device shown in FIG. 15 in detail.

Referring to FIG. 16, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference USD and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 17:
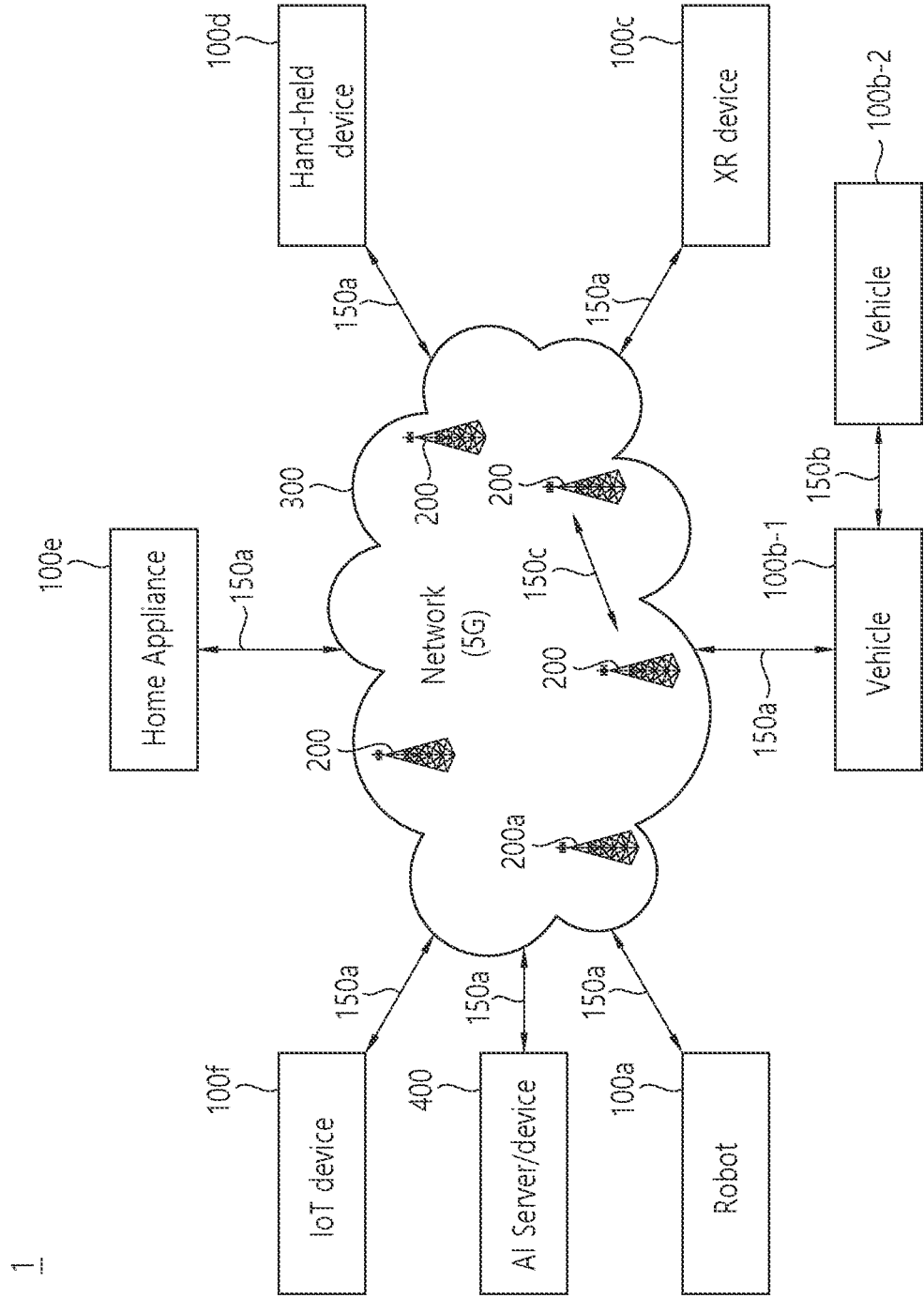
FIG. 17 illustrates a communication system 1 applied to the disclosure of the present specification.

FIG. 17 illustrates a communication system 1 applied to the disclosure of the present specification.

Referring to FIG. 17, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method performed by a User Equipment (UE), the method comprising:
performing a registration procedure with an Access and mobility Management Function (AMF);
receiving a UE Route Selection Policies (URSP) rule from a Policy Control Function (PCF);
transmitting a Protocol Data Unit (PDU) session related message to a Session Management Function (SMF) device,
wherein the PDU session related message includes:
i) a PDU session Identifier (ID) and N1 Session Management (SM) information, and
ii) a first indication related to a communication through a PC5 link;
receiving a response message from the SMF device,
wherein the response message includes:
i) a first Quality of Service (QOS) rule to be used on a Uu link, ii) a second QoS rule to be used on the PC5 link, and
iii) a path selection rule for whether data should be transmitted over the Uu link or the PC5 link;
setting up the PC5 link with a peer UE;
receiving resource scheduling for the PC5 link from a base station; and
performing the communication through the PC5 link with the peer UE.

2. The method of claim 1, wherein the PDU session related message is a PDU session establishment request message or a PDU session modification request message, and
wherein the response message is a PDU session establishment accept message or a PDU session modification command.

3. The method of claim 1, wherein the method further comprises:
receiving a measurement configuration for the PC5 link from the base station;
performing measurement on the PC5 link based on the measurement configuration and transmitting a measurement report to the base station; and
receiving an RRC signal for path switching to the Uu link from the base station.

4. The method of claim 3, wherein the method further comprises performing a procedure of setting up a Data Radio Bearer (DRB) through the Uu link based on the RRC signal.

5. The method of claim 1, wherein setting up the PC5 link with the peer UE comprises:
transmitting, to the base station, a first Radio Resource Control (RRC) message including an indication informing that PC5 link setup is possible, based on proximity of the peer UE;
receiving, from the base station, a second RRC message including an indication informing path switching; and
setting up the PC5 link with the peer UE based on the indication informing the path switching.

6. The method of claim 5, wherein the second RRC message further includes information about a timer.

7. The method of claim 6, wherein the PC5 link and the Uu link are both available until the timer based on the information expires.

8. A chipset mounted on a User Equipment (UE), the chipset comprising:
at least one processor; and
at least one memory for storing instructions and operably electrically connectable to the at least one processor, wherein the instructions, based on being executed by the at least one processor, perform operations comprising:
performing a registration procedure with an Access and mobility Management Function (AMF);
receiving a UE Route Selection Policies (URSP) rule from a Policy Control Function (PCF);
transmitting a Protocol Data Unit (PDU) session related message to a Session Management Function (SMF) device,
wherein the PDU session related message includes:
i) a PDU session Identifier (ID) and N1 Session Management (SM) information, and
ii) a first indication related to a communication through a PC5 link;
receiving a response message from the SMF device,
wherein the response message includes:
i) a first Quality of Service (QOS) rule to be used on a Uu link,
ii) a second QoS rule to be used on the PC5 link, and
iii) a path selection rule for whether data should be transmitted over the Uu link or the PC5 link;
setting up the PC5 link with a peer UE;
receiving resource scheduling for the PC5 link from a base station; and
performing the communication through the PC5 link with the peer UE.

9. The chipset of claim 8, wherein the PDU session related message is a PDU session establishment request message or a PDU session modification request message, and
wherein the response message is a PDU session establishment accept message or a PDU session modification command.

10. The chipset of claim 8, wherein the operations further comprise receiving a measurement configuration for the PC5 link from the base station;
performing measurement on the PC5 link based on the measurement configuration and transmitting a measurement report to the base station; and
receiving an RRC signal for path switching to the Uu link from the base station.

11. The chipset of claim 10, wherein the operations further comprise performing a procedure of setting up a Data Radio Bearer (DRB) through the Uu link based on the RRC signal.

12. The chipset of claim 10, wherein setting up the PC5 link with the peer UE comprises:
transmitting, to the base station, a first Radio Resource Control (RRC) message including an indication informing that PC5 link setup is possible, based on proximity of the peer UE;
receiving, from the base station, a second RRC message including an indication informing path switching; and
setting up the PC5 link with the peer UE based on the indication informing the path switching.

13. The chipset of claim 12, wherein the second RRC message further includes information about a timer, and
wherein the PC5 link and the Uu link are both available until the timer based on the information expires.

14. A device for a User Equipment (UE), the device comprising:
a transceiver;
at least one processor; and
at least one memory for storing instructions and operably electrically connectable to the at least one processor, wherein the instructions, based on being executed by the at least one processor, perform operations comprising:
performing a registration procedure with an Access and mobility Management Function (AMF);
receiving, via the transceiver, a UE Route Selection Policies (URSP) rule from a Policy Control Function (PCF);
transmitting, via the transceiver, a Protocol Data Unit (PDU) session related message to a Session Management Function (SMF) device,
wherein the PDU session related message includes:
i) a PDU session Identifier (ID) and N1 Session Management (SM) information, and
ii) a first indication related to a communication through a PC5 link;
receiving a response message from the SMF device,
wherein the response message includes:
i) a first Quality of Service (QOS) rule to be used on a Uu link,
ii) a second QoS rule to be used on the PC5 link, and
iii) a path selection rule for whether data should be transmitted over the Uu link or the PC5 link;

setting up the PC5 link with a peer UE;
receiving resource scheduling for the PC5 link from a base station; and
performing the communication through the PC5 link with the peer UE.

\* \* \* \* \*